US009655004B2

(12) United States Patent
Yu et al.

(10) Patent No.: US 9,655,004 B2
(45) Date of Patent: May 16, 2017

(54) APPARATUS FOR ETHERNET TRAFFIC AGGREGATION OF RADIO LINKS

(71) Applicant: Exalt Communications Incorporated, Campbell, CA (US)

(72) Inventors: Jungji Yu, Saratoga, CA (US); Peter Smidth, San Luis Obispo, CA (US); Yongmin Zhang, San Jose, CA (US)

(73) Assignee: Exalt Wireless, Inc., Campbell, CA (US)

( * ) Notice: Subject to any disclaimer, the term of this patent is extended or adjusted under 35 U.S.C. 154(b) by 496 days.

(21) Appl. No.: 14/107,664

(22) Filed: Dec. 16, 2013

(65) Prior Publication Data

US 2014/0105024 A1    Apr. 17, 2014

Related U.S. Application Data

(63) Continuation of application No. 12/618,666, filed on Nov. 13, 2009, now Pat. No. 8,611,356.

(51) Int. Cl.
| | |
|---|---|
| *H04W 28/08* | (2009.01) |
| *H04L 12/413* | (2006.01) |
| *H04L 12/803* | (2013.01) |
| *H04L 12/801* | (2013.01) |

(52) U.S. Cl.
CPC ........... *H04W 28/08* (2013.01); *H04L 12/413* (2013.01); *H04L 47/10* (2013.01); *H04L 47/125* (2013.01)

(58) Field of Classification Search
CPC ..... H04L 12/413; H04L 47/10; H04L 47/125; H04W 28/08
See application file for complete search history.

(56) References Cited

U.S. PATENT DOCUMENTS

| | | | |
|---|---|---|---|
| 4,764,921 A | 8/1988 | Graves et al. | |
| 4,873,702 A | 10/1989 | Chiu | |
| 5,241,702 A | 8/1993 | Dent | |
| 5,442,655 A | 8/1995 | Dedic et al. | |
| 5,805,632 A | 9/1998 | Leger | |
| 6,560,237 B1 | 5/2003 | Hiscock et al. | |
| 6,671,112 B2 | 12/2003 | Murakami et al. | |
| 6,862,618 B1 * | 3/2005 | Gray | H04L 45/00 370/468 |

(Continued)

*Primary Examiner* — Redentor Pasia
(74) *Attorney, Agent, or Firm* — Hickman Palermo Becker Bingham LLP; Malgorzata A. Kulczycka (57) ABSTRACT

A multi-radio device system includes a set of sending radio devices and a set of receiving radio devices. Among the sending radio devices is a load-balancing radio device that receives data packets from an originating network. The load-balancing radio device labels data packets with sequence numbers and distributes the labeled data packets among the sending radio devices based on the relative capacities and statuses of those sending radio devices. The sending radio devices transmit the labeled data packets to the receiving radio devices. The receiving radio devices send the labeled data packets to an aggregating radio device within the set of receiving radio devices. The aggregating radio device uses the sequence numbers to ensure that the data packets are forwarded to a destination network in the correct order, extracting original data packets from the labeled data packets before forwarding the original data packets on toward the destination network.

20 Claims, 3 Drawing Sheets

(56) References Cited

U.S. PATENT DOCUMENTS

| | | | |
|---|---|---|---|
| 6,880,100 B2 * | 4/2005 | Mora | H04L 67/104 709/224 |
| 6,934,293 B1 * | 8/2005 | DeJager | H04L 47/10 370/389 |
| 7,286,853 B2 * | 10/2007 | Meier | H04L 12/4625 370/380 |
| 7,600,040 B1 | 10/2009 | Henry et al. | |
| 9,015,299 B1 * | 4/2015 | Shah | H04L 29/06 370/232 |
| 2003/0112817 A1 | 6/2003 | Woo et al. | |
| 2004/0076161 A1 | 4/2004 | Lavian et al. | |
| 2004/0100963 A1 | 5/2004 | Guo | |
| 2004/0125787 A1 * | 7/2004 | May | H04L 7/041 370/350 |
| 2004/0131028 A1 | 7/2004 | Schiff et al. | |
| 2005/0131984 A1 | 6/2005 | Hofmann et al. | |
| 2006/0168313 A1 * | 7/2006 | Robinson | H04L 47/10 709/236 |
| 2006/0236376 A1 | 10/2006 | Liu et al. | |
| 2008/0062868 A1 * | 3/2008 | GadelRab | H04L 12/5693 370/230 |
| 2008/0117855 A1 | 5/2008 | Choi et al. | |
| 2009/0073881 A1 * | 3/2009 | Cui | H04L 47/10 370/235 |
| 2009/0141627 A1 * | 6/2009 | Gonzalez | H04L 47/26 370/230 |
| 2010/0023658 A1 * | 1/2010 | Diab | H04L 12/40039 710/59 |
| 2010/0040347 A1 | 2/2010 | Kent et al. | |
| 2010/0046554 A1 | 2/2010 | Wilkinson | |
| 2010/0322105 A1 * | 12/2010 | Diab | H04L 12/4625 370/254 |
| 2012/0307637 A1 * | 12/2012 | Diab | H04L 12/40032 370/235 |

* cited by examiner

APPARATUS FOR ETHERNET TRAFFIC AGGREGATION OF RADIO LINKS

CROSS-REFERENCE TO RELATED APPLICATIONS; BENEFIT CLAIM

This application is a Continuation of U.S. patent application Ser. No. 12/618,666, filed Nov. 13, 2009, the entire contents of which are hereby incorporated by reference for all purposes as if fully set forth herein. The applicants hereby rescind any disclaimer of claim scope in the parent application or the prosecution history thereof and advise the USPTO that the claims in this application may be broader than any claim in the parent application.

RELATED APPLICATIONS

The present application is related to the following patent applications, each of which is incorporated by reference for all purposes as though fully disclosed herein: U.S. patent application Ser. No. 11/302,102, titled "METHOD AND APPARATUS FOR TIMING AND/OR FREQUENCY SYNCHRONIZATION IN AN RF RECEIVER," filed on Dec. 12, 2005; U.S. patent application Ser. No. 11/301,810, titled "ELECTRONICALLY CONFIGURABLE TRANSMIT AND RECEIVE PATHS FOR FDD WIRELESS COMMUNICATION DEVICES," filed on Dec. 12, 2005; U.S. patent application Ser. No. 12/138,239, titled "AUTOMATIC TIMING SYNCHRONIZATION FOR WIRELESS RADIO NETWORKS," filed on Jun. 12, 2008; U.S. patent application Ser. No. 12/345,630, titled "DECISION DIRECTED DC OFFSET REMOVAL," filed on Dec. 29, 2008; and U.S. patent application Ser. No. 12/345,290, titled "ADAPTIVE MULTI-SERVICE DATA FRAMING," filed on Dec. 29, 2008.

FIELD OF THE INVENTION

The present invention relates to data communication, and, more specifically, to techniques for load balancing Ethernet traffic among multiple radios in a wireless communication system.

BACKGROUND

Flow-based load-balancing involves classifying data communication traffic into flows based on characteristics of data packets. As data packets (for example, Internet Protocol (IP) data packets) arrive at a load-balancing device (or "load-balancer"), the load-balancer examines these data packets to determine the relevant characteristics that these data packets possess. The load-balancer may be configured with a set of stored criteria against which the load-balancer compares the characteristics of each data packet. The set of stored criteria defines one or more flows; each flow is associated with one or more criteria. Upon determining that a received data packet's characteristics satisfy a particular flow's defined criteria, the load-balancer assigns that data packet to the particular flow. The load-balancer also may be configured with a set of stored rules. Each flow may be associated with one or more rules. After determining that a data packet belongs to a particular flow, the load-balancer may apply the rules to the data packet in order to handle the data packet in a specified manner. Thus, the load-balancer may handle all data packets that belong to a particular flow according to that flow's set of rules, but the load-balancer may handle data packets that belong to different flows differently if those flows' rules differ. A flow's rules may indicate, among other actions, that the load-balancer should route all data packets that belong to the flow ought to a particular server.

For example, in order to determine the flow to which an incoming data packet belongs, the load-balancer (which might be an Ethernet switch or router) may examine the data packet's "quintuple" (or "5-tuple"). This quintuple typically consists of (a) the data packet's source IP address, (b) the data packet's destination IP address, (c) the data packet's source Transmission Control Protocol (TCP) or User Datagram Protocol (UDP) port, (d) the data packet's destination TCP or UDP port, and (e) the data packet's transport layer protocol identifier (e.g., TCP or UDP). The load-balancer obtains this information by examining the data packet's headers (e.g., the IP header, the TCP header, and/or the UDP header). Each header is of an expected length and offset, and therefore the load-balancer knows at which bits of the data packet to look in order to obtain the quintuple information.

After obtaining the data packet's quintuple, the load-balancer determines which, if any, of the flows' criteria are satisfied by the information in the quintuple. For example, a flow might be associated with criteria that specify a range of source IP addresses and destination IP addresses in order to shape all traffic that passes from one specified set of devices to another specified set of devices. For another example, a flow might be associated with criteria that specify a particular TCP destination port in order to shape all traffic that is likely to be associated with a particular application or purpose. Flows may be prioritized relative to each other so that a data packet will always be assigned to the highest-priority flow even if the data packet's quintuple satisfies more than one flow's criteria. Upon determining a flow whose criteria the data packet's quintuple satisfies, the load-balancer assigns the data packet to that flow and applies, to the data packet, the rules that are associated with that flow.

For example, the flow to which a data packet is assigned might be associated with rules that state that the data packet is to be encrypted and routed to a particular server—even if that server is not actually associated with the data packet's destination IP address. For another example, the rules associated with the data packet's assigned flow might state that data packet is to be dropped, and not forwarded at all. The load-balancer handles each data packet according to the rules that are associated with that data packet's assigned flow. To help ensure that no single server of a set of servers becomes overwhelmed with data traffic while other servers in the set sit relative idle, the load-balancer's rules may be configured to route different flows' data packets to different servers in the server set in a manner that is as equitable as possible. Thus, the load-balancing is "flow-based."

One limitation of flow-based load-balancing arises from the fact that flow-based load-balancing relies on quintuples to classify packets into flows. Flow-based load-balancing only works when certain protocols are being used. If protocols which do not contain the quintuple information are used, then there is no way to classify packets into flows. This limitation therefore places restrictions on the protocols that communicants are able to use in their communications. Often, communicants do not want to be restricted in this manner. Often, communicants would like to have freedom of choice in the protocols that they use to communicate with each other. Where a communications network is being used by multiple different parties, each different party might want to use a different set of communication protocols. Thus, versatility in the kinds of communications protocols that a load-balancing technique can handle would be ideal, but is not currently allowed under traditional flow-based load-balancing approaches.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein is a multi-radio device system that includes a set of sending radio devices and a set of receiving radio devices (although the roles of the sending and receiving radio devices may be shared with each other). Among the sending radio devices is a load-balancing device that is embedded in a radio (can be standalone too) that receives data packets from an originating network. The load-balancing radio device labels data packets with sequence numbers (by adding a label or by using packet encapsulation) and distributes the labeled data packets among the sending radio devices based on the relative capacities, latency, and statuses of those sending radio devices. The sending radio devices transmit the labeled data packets to the receiving radio devices. The receiving radio devices send the labeled data packets to a radio with an aggregating device embedded within the set of receiving radio devices. In an alternative embodiment of the invention, the aggregating device stands alone, external from any radio device. The aggregating radio device uses the sequence numbers to ensure that the data packets are forwarded to a destination network in the correct order, removing the label or decapsulating the original data packets from the labeled data packets before forwarding the original data packets on toward the destination network.

Also described herein is a technique for quickly determining, at the aggregating radio device, whether a data packet has been lost. The technique often beneficially avoids introducing traffic latency due to waiting for a data packet that might have been lost.

Also described herein is a technique for determining whether a pair of transmitting and sending radios is operating correctly or if some key performance parameters such as capacity and error rate are changed. The aggregating radio device discussed above sends periodic "status messages" through all radio pairs toward the load-balancing radio device. The load-balancing radio device collects statistical information concerning the ratios of status message received through each radio pair. Based on this statistical information, the load-balancing radio device determines through which of the sending radio devices and how much 'weight' of data packets the load-balancing radio device should continue to send data packets.

Also described herein is a technique for load-balancing one specified priority class of data packets in the environment discussed above, in which multiple priority classes of data packets may be communicated. In one embodiment of the invention, discussed further below, an aggregating device implements multiple priority levels of aggregation queues.

Other features that may be included in various other embodiments of the invention are discussed in more detail below.

Communication Protocol Agnosticism

Beneficially, techniques described herein are agnostic to the particular suite of communications protocols used. The techniques described herein are not limited to use in conjunction with any particular communication protocol suite. Thus, although a communicant may use the techniques described herein in conjunction with TCP, IP, and Ethernet protocol, embodiments of the invention can be used in conjunction with any set of communication protocols. Embodiments of the invention do not rely upon the protocol-based classification of packets into flows and the subsequent routing of packets based on flows to which those packets belong. This communication protocol-agnosticism thus overcomes the limitations of strictly flow-based load-balancing approaches. Techniques described herein may be used in a broad variety of scenarios without making any assumptions as to the suite of communication protocols that any communicant will use. Techniques described herein may be used without making any assumption as to the type of data traffic which will be flowing through a network.

One embodiment of the invention is described in conjunction with the use of Ethernet protocol. Although the Ethernet protocol embodiment is discussed herein, alternative embodiments of the invention may be implemented to use protocols other than Ethernet protocol.

Multi-Radio Load-Balancing and Aggregating System

Techniques according to an embodiment of the invention are performed in an environment containing multiple wireless radios which communicate with each other over radio waves. Each radio has a certain capacity. A radio's capacity, as used herein, is a measure of the throughput that the radio can provide. Throughput may be measured using any number of a variety of units; for example, throughput may be measured in bits per second. Thus, a radio's throughput, and therefore that radio's capacity, is an indication of the number of bits per second that the radio can transmit and/or receive. Different radios in the multi-radio system may have different capacities. The capacity, error rate, and even outage of a radio link is subject to many factors and can change much faster compare to wired connections. It is critical that the load-balancing and aggregation device can detect and react to these changes fast.

Figure 1:
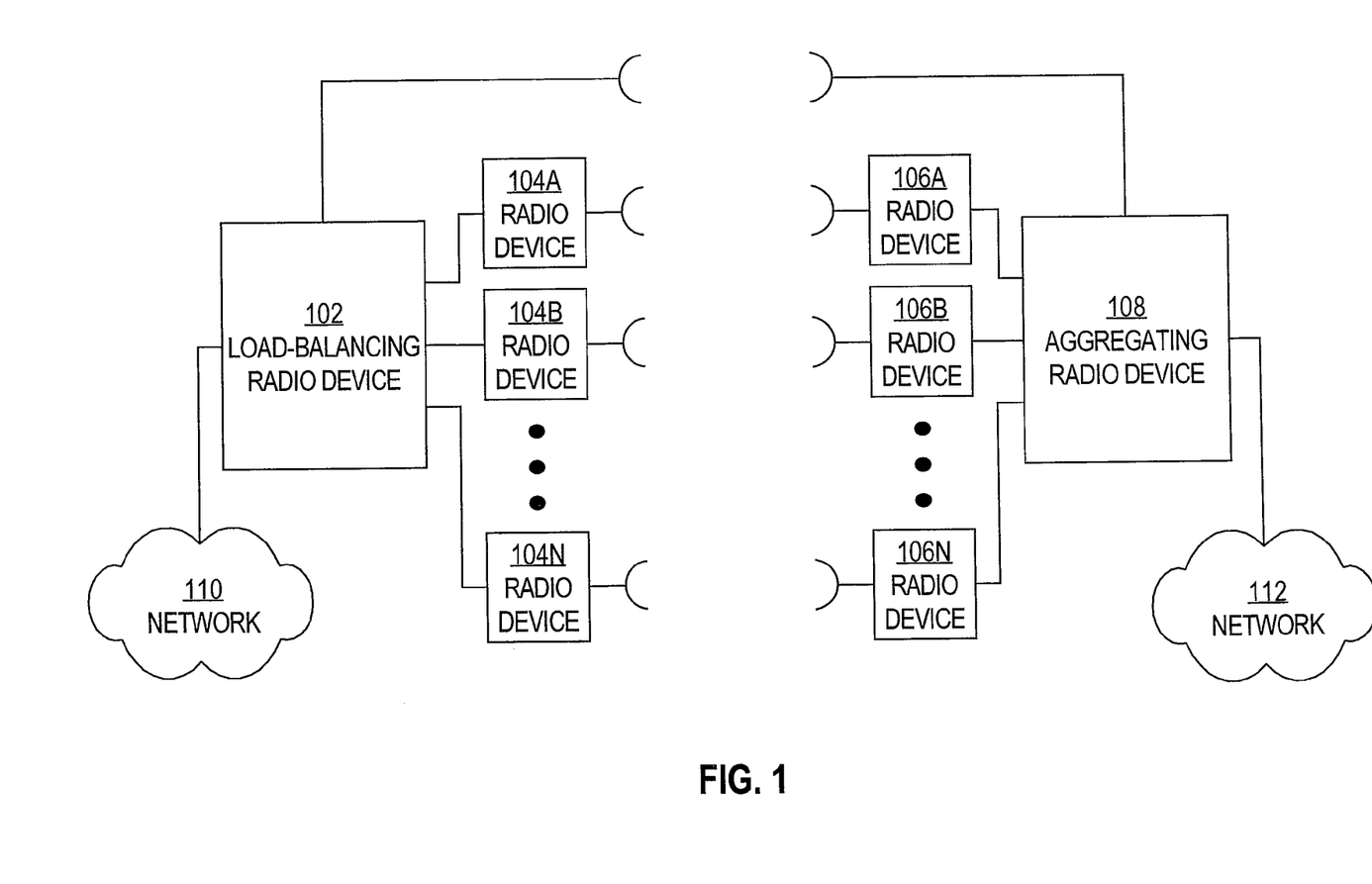
FIG. 1 is a diagram that illustrates an example of a multi-radio communication (the radios of which can be multiple individual radios or multiple radios within a single enclosure) system in which embodiments of the invention may be implemented.

FIG. 1 is a diagram that illustrates an example of a multi-radio communication system in which embodiments of the invention may be implemented. The system of FIG. 1 includes load-balancing radio device 102, which receives data from network 110, typically in the form of data packets that are transmitted according to some specified protocol. Load-balancing radio device 102 distributes, among radio devices 104A-N, the data that load-balancing radio device 102 receives from network 110. For example, load-balancing radio device 102 may send some fraction of the data (e.g., in the form of data packets) to radio device 104A, some fraction of the data to radio device 104B, and so on. Additionally, load-balancing radio device 102 may directly transmit some portion of the data over radio waves to one or more other listening radio devices, such as radio devices 106A-N and aggregating radio device 108. Essentially, load-balancing radio device 102 partitions the incoming data traffic among radio devices 104A-N and even itself.

As is mentioned above, different radios in the multi-radio system may have different capacities. For example, radio device 104A might have a capacity of 10 megabits per second (MBPS). Radio device 104B might have a capacity of 20 MBPS. Radio device 104N might have a capacity of 5 MBPS. Each of radio devices 104A-N transmits the data that it receives from load-balancing radio device 102 to one or more of radio devices 106A-N over radio waves. For example, in one embodiment of the invention, radio device 104A transmits data to radio device 106A; radio device 104B transmits data to radio device 106B; and so on. In one embodiment of the invention, load-balancing radio device 102 transmits data directly to aggregating radio device 108.

Radio devices 106A-N and aggregating radio device 108 receive data that radio devices 104A-N and load-balancing radio device 102 transmitted over radio waves. Radio devices 106A-N send the data that they receive to aggregating radio device 108. Aggregating radio device 108 aggregates the data that aggregating radio device 108 receives directly over radio waves and from radio devices 106A-N. After aggregating this data, aggregating radio device 108 sends the data to network 112, usually in the form of data packets.

Network 110 and network 112 may be any of a variety of different kinds of networks, such as, for example, local area networks (LANs), wide area networks (WANs), and/or the Internet. In one embodiment of the invention, network 110 and network 112 carry data packets that are generated and received by electronic digital devices such as computer systems. For example, the data packets may be Ethernet data packets.

Under most circumstances, the order in which aggregating radio device 108 sends data packets to network 112 is required to be the same order as that in which load-balancing radio device 102 received those data packets from network 110. For example, load-balancing radio device 102 might receive, from network 110, data packets in the order: packet 1, packet 2, packet 3, packet 4, packet 5, and packet 6. Under these circumstances, aggregating radio device 108 would need to send those data packets to network 112 in that same order.

In one embodiment of the invention, load-balancing radio device 102 attempts to distribute the data that it receives among radio devices 104A-N (and itself) in a manner that maximally utilizes the capacities of each of radio devices 104A-N (and itself). Additionally, in one embodiment of the invention, load-balancing radio device 102 alters the manner in which it distributes data among radio devices 104A-N (and itself) in response to a determination that one or more of radio devices 104A-N has a performance change or is not functioning correctly. For example, in one embodiment of the invention, if load-balancing radio device 102 determines that radio device 104A is no longer functioning correctly, then load-balancing radio device 102 redistributes, among radio devices 104B-N (and itself), the fraction of data traffic that radio device 104A would otherwise have received if radio device 104A had been functioning correctly.

Although an embodiment of the invention is discussed above in which devices 102 and 108 are, themselves, radio devices that are capable of sending and receiving data over radio waves, in an alternative embodiment of the invention, devices 102 and 108 do not actually transmit or receive data over radio waves, but, instead, send and receive data only to others of radio devices 104A-N and radio devices 106A-N to which devices 102 and 108 are physically connected (e.g., via Ethernet cables). In such an alternative embodiment, devices 102 and 108 may be standalone load-balancer and aggregators instead of devices that have radio transmission and reception capabilities. A standalone load-balancer and aggregator is different from devices such as Ethernet switches, in that such a standalone device does not inspect any part of the data packet to make decisions. Such a standalone device dispatches data packets per capacity and status of the radios connected. Such a standalone device senses the status of each radio link and adjusts the balance algorithm. In an Ethernet switch, however, data packets are checked for their MAC addresses and they are switched based on their destination address (DA). Knowing the MAC addresses of a data packet, the switch can be predict how a packet will be switched. It is difficult, if not impossible, to predict how a load-balancer will dispatch a packet, even if all incoming packets are identical.

In the discussion below, for purposes of simplicity, the flow of data traffic is described with reference to data packets that originate within network 110 and arrive within network 112. When the flow is in this direction, device 102 operates as a load-balancing device while device 108 operates as an aggregating device. However, it should be understood that in one embodiment of the invention, the flow of data traffic is in two directions, such that data packets also originate within network 112 and arrive within network 110. When the flow is in the opposite direction, device 102 operates as an aggregating device while device 108 operates as a load-balancing device. Thus, in one embodiment of the invention, devices 102 and 108 are both simultaneously load-balancing and aggregating devices, and the discussion of either function herein should be understood to apply to both in one embodiment of the invention. Similarly, although radio devices 104A-N are described in the context of devices that transmit to receiving radio devices 106A-N, radio devices 106A-N can also, in one embodiment of the invention, transmit to receiving radio devices 104A-N. Thus, functions that are discussed as being performed by one or the other set of radio devices 104A-N and 106A-N should be understood as being applicable to either set.

In one embodiment of the invention, all of the radio devices illustrated in FIG. 1 are microwave radio devices that transmit data over the microwave radio frequency spectrum. In alternative embodiments, radio devices may transmit and receive at alternative radio frequencies.

Data Packet Order Labeling

As is discussed above, in one embodiment of the invention, the order in which aggregating radio device 108 sends data packets to network 112 is required to be the same order as that in which load-balancing radio device 102 received those data packets from network 110. However, in one embodiment of the invention, at the time that data packets arrive at load-balancing radio device 102, none of those data packets contains any information that indicates the sequence or order of those data packets relative to any other data packets. In one embodiment of the invention, load-balancing radio device 102 maintains a counter that load-balancing radio device 102 increments every time that load-balancing radio device 102 receives another data packet from network 110. In such an embodiment of the invention, load-balancing radio device 102 labels, with the current value of the counter, each data packet that load-balancing radio device 102 receives. Each data packet's label travels with its data packet throughout the multi-radio system until that data packet arrives at aggregating radio device 108. Aggregating radio device uses each data packet's label in order to place data packets in the correct order relative to each other before stripping the labels from the data packets and sending the data packets on, in their original order, to network 112. The values with which load-balancing radio device 102 labels each of the data packets are called "sequence numbers."

In one embodiment of the invention the data packets that load-balancing radio device 102 receives from network 110 are Ethernet packets. An Ethernet packet typically contains a 6-byte destination address (indicating the media access control (MAC) address of the machine for which the data packet is ultimately destined), a 6-byte source address (indicating the MAC address of the machine from which the data packet was originally sent), a 2-byte Ethertype field, a variable sized payload field, and a 4-byte cyclical redundancy check (CRC) field. In one embodiment of the invention, load-balancing radio device 102 encapsulates each incoming Ethernet data packet within a new Ethernet packet; load-balancing radio device 102 inserts the original incoming Ethernet packet into the payload field of the new Ethernet packet. At the beginning of the new Ethernet packet's payload field, just before the original Ethernet packet, load-balancing device 102 inserts a 2-byte sequence number, which is the current value of the counter maintained by load-balancing radio device 102. Thus, the new Ethernet packet's payload field contains both the sequence number and the original Ethernet packet that load-balancing radio device 102 received from network 110.

In one embodiment of the invention, the source address and the destination address of the new Ethernet packet are not the same as the source address and the destination address of the original Ethernet packet encapsulated therein. Instead, in one embodiment of the invention, load-balancing radio device 102 selects one of its ports out which load-balancing radio device 102 will be sending the new Ethernet packet. Each of the ports corresponds to a pair of sending and receiving radio devices. Load-balancing radio device 102 sets the source address of the new Ethernet packet to be the MAC address of the sending radio device (i.e., the radio device that will actually send the data over radio waves) (e.g., one of radio devices 104A-N or load-balancing radio device 102 itself). Load-balancing radio device 102 sets the destination address of the new Ethernet packet to be the MAC address of the receiving radio device (i.e., the radio device that will actually receive the data over radio waves) (e.g., one of radio devices 106A-N or aggregating radio device 108). The addresses indicated in the original Ethernet packet encapsulated within the new Ethernet packet remain unchanged.

Encapsulating the original Ethernet packet within another Ethernet packet in this manner allows the system to preserve the original packet ordering while also permitting the use, in the system, of intermediary radio and network devices which understand how to handle Ethernet packets (but which might not understand how to handle packets that conformed, instead, to some other, proprietary, protocol).

Although an embodiment of the invention is discussed above in which load-balancing radio device 102 has multiple outgoing ports, which are connected with radio devices 104A-N, in an alternative embodiment of the invention, load-balancing radio device 102 has only one outgoing port. In such an alternative embodiment of the invention, the sole outgoing port of load-balancing radio device 102 is connected to an Ethernet switch, which distributes the new Ethernet packets among radio devices 104A-N based on the new MAC addresses indicated in those new Ethernet packets. Similarly, in one alternative embodiment of the invention, radio devices 106A-N each send data packets to an Ethernet switch, which then sends those packets on to aggregating radio device 108; in such an alternative embodiment of the invention, radio devices 106A-N are not directly connected to aggregating radio device 108. Aggregating radio device may therefore, in one embodiment of the invention, have just one incoming port, which is connected to an Ethernet switch.

Although an embodiment of the invention is described above in which the new MAC addresses are contained in the header of the encapsulating Ethernet packet, in an alternative embodiment of the invention, the new (source and destination) MAC addresses may be placed anywhere within the encapsulating or encapsulated Ethernet packets. If Ethernet switches are not used, then new MAC addresses are not necessary.

Capacity-Based Load-Balancing

As is mentioned above, in one embodiment of the invention, load-balancing radio device 102 distributes data packets among radio devices 104A-N based on the relative capacities of those radio devices. In one embodiment of the invention, a user or administrator programs load-balancing radio device 102 with information that indicates the capacity of each of radio device 104A-N. Load-balancing radio device 102 then sends data packets to each of functioning radio devices 104A-N in a proportion that is based on the proportional capacities of the devices. For example, if load-balancing radio device 102 has a capacity of 50 MBPS, radio device 104A has a capacity of 30 MBPS, radio device 104B has a capacity of 20 MBPS, and there are no other radio devices connected to load-balancing radio device 102, then load-balancing radio device 102 may transmit half of the incoming data traffic over radio waves itself, send three tenths of the incoming data traffic to radio device 104A, and send one fifth of the incoming data traffic to radio device 104B. Even data traffic that belongs to a single application may be distributed among multiple different ones of radio devices 104A-N.

In an alternative embodiment of the invention, instead of being programmed with the capacities of each of radio devices 104A-N, load-balancing radio device 102 sends data packets to each of radio device 104A-N at the highest rate possible until load-balancing device 102 detects a failure of one of radio devices 104A-N to transmit a data packet over radio waves. In response to detecting that a particular radio device has failed to transmit a particular data packet, load-balancing radio device re-sends that particular data packet to a different one of radio devices 104A-N.

In one embodiment of the invention, each of radio devices 104A-N has a packet queue of finite size. In one embodiment of the invention, whenever any one of the packet queues of radio devices 104A-N becomes full (or reaches a specified threshold level of fullness), that particular radio device sends a notification to load-balancing radio device 102. In response, load-balancing radio device 102 ceases sending packets to that particular radio device for a specified period of time, thereby allowing the particular radio device to empty its packet queue at least partially.

According to one embodiment of the invention, load-balancing device 102 considers the dynamic nature of the radio transmission due to weather and other interferences. Periodically, load-balancing device 102 collects information on bandwidth, bit error rate, and radio transmission latency for each of radio devices 104A-N. Based on this information, load-balancing device periodically adjusts the distribution of data traffic among radio devices 104A-N. For example, a radio device with high bandwidth but high bit error rate during a certain time period may receive a lighter data traffic load than another radio device with a lower bandwidth and a lower bit error rate. Load-balancing device 102 may temporarily shut down a radio device whose bit error rate exceeds a specified threshold. In one embodiment of the invention, each factor (radio bandwidth, bit error rate, and latency) is associated with a user-specified and programmable weight. As a result, the load-balancing scheme can be fine-tuned and tailored to deliver the best performance.

Detecting Link Failures Via Status Messages

As is mentioned above, in one embodiment of the invention, if one of radio devices 104A-N stops functioning correctly, then load-balancing radio device 102 ceases sending data packets to the non-functioning one of radio devices 104A-N. Techniques are described below for detecting when one of radio devices 104A-N (or its corresponding recipient one of radio devices 106A-N) has ceased functioning correctly.

In one embodiment of the invention, aggregating radio device 108 periodically sends very small dummy packets, called "status messages" to each of radio devices 106A-N. When functioning correctly, radio devices 106A-N send these status messages "backwards" over radio waves to corresponding ones of radio devices 104A-N—the ones of radio devices 104A-N with which ones of radio devices 106A-N are expressly paired. Radio devices 104A-N receive the status messages over the radio waves and forward the status messages to load-balancing radio device 102. For each port of load-balancing radio device 102 (each connected to a different one of radio devices 104A-N), load-balancing radio device 102 maintains statistics concerning the number of status messages that have been received on that port in a specified period of time. In one embodiment of the invention, if the number of status messages that have been received on a particular port during the specified period of time falls beneath a specified threshold, then load-balancing radio device 102 assumes that one of the radio devices associated with that port—either (a) the one of radio devices 104A-N that is connected to that port, or (b) the corresponding one of radio devices 106A-N that transmits status messages over radio waves to the one of radio devices 104A-N that is connected to that port—is not functioning correctly.

In response to determining that at least one radio device associated with a port is not functioning correctly, load-balancing radio device 102 takes some specified action. For example, load-balancing radio device 102 may cease sending any data packets through that port for a specified period of time. For another example, load-balancing radio device 102 may cease sending data packets through that port until the number of status messages received over that port during a specified window of time once again exceeds a specified threshold. As is discussed above, load-balancing radio device 102 may distribute the data packets which otherwise would have been sent to that port among the remaining operating ports (and, consequently, the ones of radio devices 104A-N that are connected to those ports) instead.

Packet Aggregation and Reordering

As is discussed above, in one embodiment of the invention, within load-balancing radio device 102, each of the original Ethernet packets is labeled with a sequence number, either by adding a tag that contains the sequence number or by encapsulating the packet, along with a sequence number, inside of other, new Ethernet packets. Aggregating radio device 108 receives these new Ethernet packets, obtains the sequence number either by un-tagging or de-capsulating the original Ethernet packets, and sends the original Ethernet packets in the correct order to network 112 based on the sequence numbers associated with those Ethernet packets.

In one embodiment of the invention, aggregating radio device 108 keeps track of the sequence number of the data packet that aggregating radio device 108 most recently sent to network 112. Thus, aggregating radio device 108 knows the sequence number of the next data packet that should be sent to network 112 (that number being one greater than the sequence number associated with the last data packet that aggregating radio device 108 sent to network 112). The sequence number will wrap around eventually. In one embodiment of the invention, aggregating radio device 108 maintains a separate queue for each incoming port—each such incoming port being connected to a different one of radio devices 106A-N or the radio receiver of aggregating radio device 108 itself. Aggregating radio device 108 determines whether the data packet bearing the next sequence number is in any of the queues. If that data packet is in one of the queues, then aggregating radio device 108 handles that data packet as specified above, decapsulating the original data packet from within, and sending the original packet onward to network 112.

Conversely, if the data packet bearing the expected next sequence number is not in any of the queues, and if all of the queues currently contain data packets that indicate sequence numbers that are greater than the expected next sequence number, then aggregating radio device 108 safely and immediately concludes that the data packet associated with the expected next sequence number has been lost somehow. Under such circumstances, there is no need to wait for the data packet associated with the expected next sequence number to arrive in any queue, since all of the queues already contain data packets which would have been sent, by load-balancing radio device 102, after the expected data packet had been sent.

However, if one or more of the queues is empty, then it is possible that the data packet containing the expected next sequence number might still arrive in that empty queue. Under such circumstances, aggregating radio device 108 waits for a specified period of time for the data packet to arrive in an empty queue. If the data packet associated with the expected next sequence number does not arrive in any queue during the specified period of time, or if each empty queue becomes occupied with at least one data packet that is not associated with the expected next sequence number before the expiration of the specified period of time, then aggregating radio device 108 concludes that the data packet associated with the expected next sequence number has been lost somehow. In one embodiment of the invention, under any circumstance in which aggregating radio device 108 determines that a data packet has been lost, aggregating radio device 108 increments a counter that indicates the expected next sequence number, and continues to process the remaining incoming data packets as described above. Under such circumstances, higher-level communication protocol layers may deal with the lost packet, perhaps by requesting the re-transmission of the lost packet. Such requesting may come from destination computing devices that reside within network 112, for example.

In one embodiment of the invention, the amount of time that aggregating radio device 108 waits, as discussed above, is user-programmable. In such an embodiment of the invention, the specified amount of time may be programmed to correspond to the maximum latency of any of the radio devices. The specified amount of time might be programmed to be 5 milliseconds, for example, if 5 milliseconds is the maximum latency of any of radio devices 104A-N and 106A-N.

Figure 2:
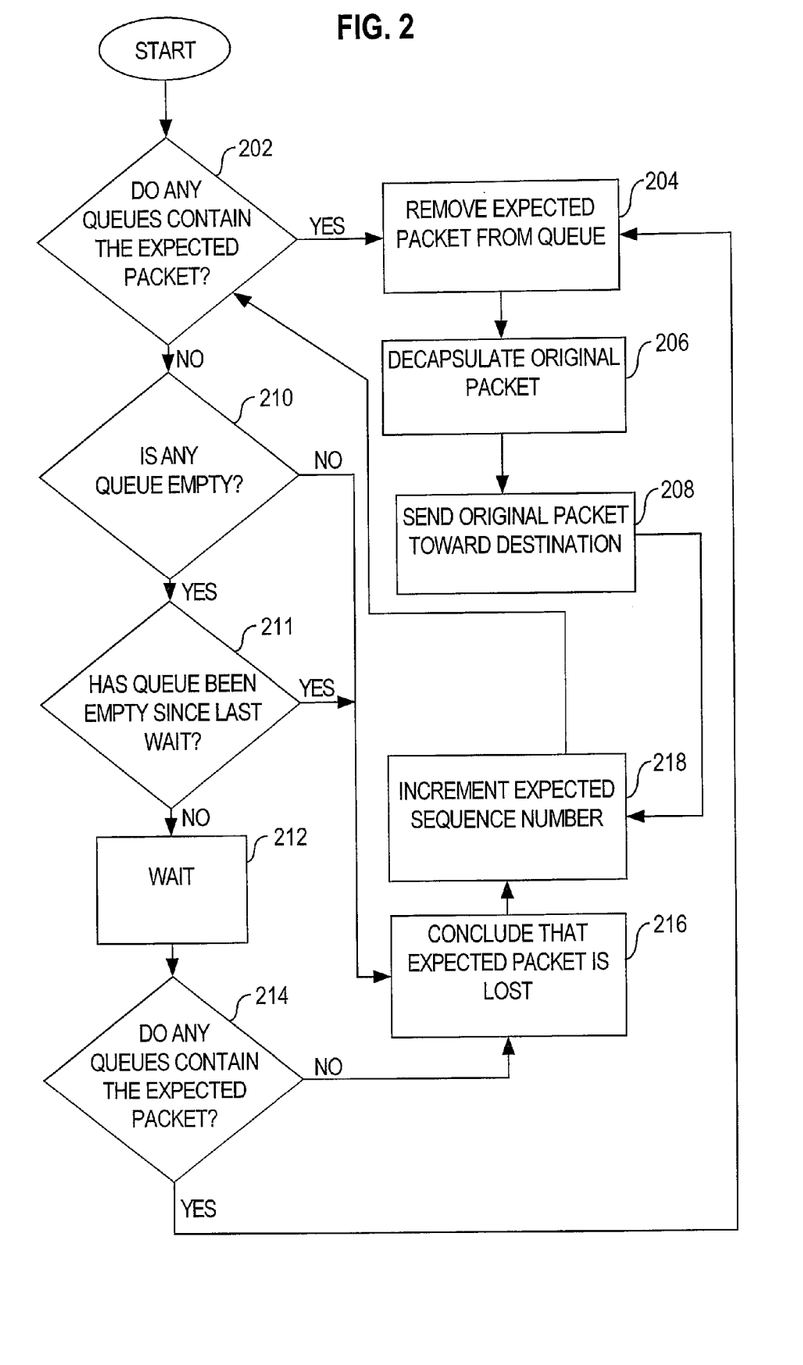
FIG. 2 is a flow diagram that illustrates a technique for aggregating data packets in the correct order, according to an embodiment of the invention.

FIG. 2 is a flow diagram that illustrates a technique for aggregating data packets in the correct order, according to an embodiment of the invention. The technique may be performed by aggregating radio device 108, for example.

In block 202, the aggregating device determines whether any of the aggregating device's queues contains a data packet that indicates the expected next sequence number. If at least one queue contains a data packet that indicates the expected next sequence number, then control passes to block 204. Otherwise, control passes to block 210.

In block 204, the aggregating device removes the data packet that contains the expected next sequence number from the queue that contains that data packet. In block 206, the aggregating device decapsulates an original data packet from the data packet that contains the expected next sequence number. In block 208, the aggregating device sends the original data packet onward towards a destination address that is indicated by the original data packet in the original data packet's destination address field. Control then passes to block 218.

Alternatively, in block 210, the aggregating device determines whether any of the aggregating device's queues are empty. If at least one of the aggregating device's queues is empty, then control passes to block 211. Otherwise, control passes to block 216.

In block 211, the aggregating device determines whether all of the empty queues have been empty since the last time that the aggregating device waited for an expected packet due to at least one queue being empty (as described with reference to block 212 below). If all of the empty queues have been empty since the aggregating device last waited in such a manner and for such reasons, then control passes to block 216. Otherwise, control passes to block 212.

In block 212, the aggregating device waits for a specified period of time. In block 214, the aggregating device determines whether any of the aggregating device's queues contains a data packet that indicates the expected next sequence number. If at least one queue contains a data packet that indicates the expected next sequence number, then control passes back to block 204. Otherwise, control passes to block 216.

In block 216, the aggregating device concludes that the data packet that indicates that expected next sequence number has been lost somehow (perhaps dropped during transmission). Control passes to block 218.

In block 218, the aggregating device increments the expected next sequence number. Control then passes back to block 202.

In the embodiment of the invention described above, the aggregating device waits for a specified period of time in block 212 for a data packet with the expected next sequence number to arrive in one of the aggregating device's queues. However, in an alternative embodiment of the invention, the waiting of block 212 only occurs under certain circumstances. Specifically, in one embodiment of the invention, the aggregating device only performs the waiting described in block 212 if the queue that was determined to be empty in block 210 has contained at least one data packet since the last time that the aggregating device waited for the expected data packet to arrive in that queue. In such an embodiment, if the queue that is determined to be empty in block 210 has not contained any data packet since the last time that the aggregating device performed the waiting described in block 212, then, instead of control passing from block 210 to block 212 when that queue is determined to be empty still, control passes directly to block 216 instead. The assumption in such a scenario is that the queue's continued empty status is probably indicative of a problem with the queue. Under those circumstances, waiting again on the same queue would probably be a waste of time.

Quality of Service Load-Balancing

In one embodiment of the invention, load-balancing device 102 can be set to operate, optionally, in quality of service mode. While quality of service mode is enabled, load-balancing device 102 sorts incoming data packets and places the data packets in priority queues based on quality of service priorities. Load-balancing device 102 may contain two or more priority queues—a separate priority queue for each different priority level. Load-balancing device 102 sorts the incoming data packets into priority queues before transmitting those data packets or sending those data packets to any of radio devices 104A-N.

In one embodiment of the invention, load-balancing device 102 keeps track of multiple sequence numbers, one for each priority level. Aggregating radio device 108 implements multiple priority levels of aggregation queues. Each priority level may have multiple queues, one for each radio device. Aggregating radio device 108 checks the quality of service priority tag of each arriving data packet. In such an embodiment, aggregating radio device 108 places data packets in the corresponding priority level aggregation queues based on the priority tag.

In one embodiment of the invention, load-balancing is performed only for data traffic that belongs to a specified priority level. Thus, in such an embodiment of the invention, load-balancing radio device 102 only load-balances data packets from a specified one of the priority queues. Data traffic mapping, whether VLAN or other protocol-based, also may be user-specified and programmed. In one embodiment of the invention, load-balancing radio device 102 presents a user interface through which a user of load-balancing radio device 102 can program that device to map certain characteristics to various quality of service priority levels. For example, all packets containing a first MAC address may be mapped to a first quality of service priority level, while all packets containing a second MAC address may be mapped to a second quality of service priority level. Additionally or alternatively, different quality of service levels may be mapped to different sets of ports (e.g., TCP ports) and/or virtual local area network (VLAN) priorities, among other possibilities.

In one embodiment of the invention, a separate Ethernet tag field is used to indicate the quality of service priority level that is to be load-balanced.

In one embodiment of the invention, aggregating radio device 108 checks the quality of service priority tag of each arriving data packet. In such an embodiment, aggregating radio device 108 only places those data packet that have the quality of service load-balance priority into the aggregation queues. In such an embodiment, aggregating radio device 108 only orders these data packets based on sequence number (using techniques discussed above). Aggregating radio device 108 sends all other data packets on to network 112 without enqueueing those data packets and without checking their sequence numbers for correct ordering.

Flow Control

In one embodiment of the invention, radio devices 104A-N send flow control messages back to load-balancing radio device 102 in order to ensure that none of radio devices 104A-N receives too many or few too packets. In one such embodiment, each of radio devices 104A-N is configured with an upper threshold and a lower threshold. The upper threshold is typically set to some value that is less than the total number of packets that can be stored concurrently within the radio devices' packet queue. The lower threshold is typically set to some value that is less than the upper threshold but greater than zero. As load-balancing radio device 102 sends packets to a particular one of radio devices 104A-N, the particular radio device receives those packets and stores those packets within its queue.

If, at any time, the number of packets in the particular radio device's queue reaches the upper threshold, then the particular radio device sends a "stop" flow control message to load-balancing radio device 102. In response to receiving the "stop" flow control message from the particular radio device, load-balancing radio device 102 at least temporarily stops sending packets to the particular radio device. Load-balancing radio device 102 may continue to send packets to the other ones of radio devices 104A-N.

After load-balancing radio device 102 stops sending packets to the particular radio device, the particular radio device's queue will gradually empty as the particular radio device removes packets from its queue and transmits those packets to the corresponding one of radio devices 106A-N. Eventually, the number of packets remaining the particular radio devices' queue will reach the lower threshold. In one embodiment of the invention, in response to the number of data packets remaining in the queue reaching the lower threshold, the particular radio device sends a "resume" flow control message to load-balancing radio device 102. In response to receiving the "resume" flow control message from the particular radio device, load-balancing device 102 once again sends packets to the particular radio device.

According to one embodiment of the invention, in between (a) the time that load-balancing radio device 102 receives a "stop" flow control message from the particular radio device and (b) the time that load-balancing radio device 102 receives a "resume" flow control message form the particular radio device, load-balancing radio device 102 does not send any packets to the particular radio device; load-balancing radio device 102 does not continue to send packets to the particular radio device until load-balancing radio device 102 receives the "resume" flow control message from the particular radio device.

However, in an alternative embodiment of the invention, at the same time or very close to the time at which load-balancing radio device 102 receives a "stop" flow control message from the particular radio device, load-balancing radio device 102 starts a timeout clock. The timeout clock is set to expire after some specified amount of time passes from the time that the timeout clock is started, and is specific to the particular radio device. In one embodiment of the invention, load-balancing radio device 102 maintains a separate timeout clock for each of radio devices 104A-N. In such an embodiment of the invention, as soon as the timeout clock for the particular radio device expires, load-balancing radio device 102 resumes sending packets to the particular radio device just as though load-balancing radio device 102 had received a "resume" flow control message from the particular radio device, even though load-balancing radio device 102 did not actually receive such a message. This timeout mechanism avoids some problems that may arise when a flow control message is lost or garbled for any of a variety of reasons, and helps to ensure that particular radio device will not be cut off indefinitely from receiving further packets from load-balancing radio device 102.

In an embodiment of the invention discussed above, load-balancing radio device 102 at least temporarily stops sending data packets to a particular radio device in response to receiving, from the particular radio device, a "stop" flow control message. However, it is possible that the same problem which is causing the queue of the particular radio device to overfill is also causing the queues of all of radio devices 104A-N to overfill. For example, the queues of all of radio devices 104A-N might be overfilling because of congestion or because load-balancing device 102 is attempting to send a greater load of data than radio device 104A-N can handle. Under such circumstances, load-balancing radio device 102 will receive a "stop" message from each of radio devices 104A-N. However, it is not practical for load-balancing radio device 102 to cease sending data packets completely. Therefore, in one embodiment of the invention, whenever load-balancing radio device 102 receives a "stop" flow control message from any one of radio devices 104A-N, load-balancing radio device 102 determines whether there are any others of radio devices 104A-N to which load-balancing radio device 102 has not stopped temporarily sending packets in response to "stop" flow control messages. If there is at least one such other radio device, then load-balancing radio device 102 temporarily stops sending data packets to the particular radio device from which load-balancing radio device 102 most recently received the "stop" flow control message, as described above. However, in one embodiment of the invention, if load-balancing radio device 102 has already stopped sending data packets to all of the others of radio devices 104A-N in response to having previously received "stop" flow control messages from those other radio devices also, then load-balancing radio device 102 responsively ignores the most recently received "stop" flow control message. In one embodiment of the invention, in addition to ignoring the most recently received "stop" flow control message, load-balancing radio device 102 also resumes sending data packets to all of radio devices 104A-N, even though load-balancing radio device 102 has not yet received "resume" flow control messages from any of those radio devices.

Avoiding Use of Low Quality Links

As is discussed above, load-balancing radio device 102 is connected to each of radio devices 104A-N through a separate port of load-balancing device radio device 102. Each of these connections is a separate "link." However, for a variety of reasons, under some circumstances, a particular radio device of radio devices 104A-N might be experiencing transmission problems. These problems might be manifested through the particular radio device having a very high error rate, for example. In one embodiment of the invention, when a particular radio device's error rate exceeds a specified upper threshold, then load-balancing radio device 102 at least temporarily deactivates the link to that particular radio device, so that load-balancing radio device 102 does not send any data packets to the particular radio device for as long as the link is deactivated (load-balancing radio device 102 may still send status packets—which do not contain any data that would be used by devices in or beyond network 112—over the deactivated link, as is further discussed below). In such an embodiment of the invention, after such a link has been deactivated, the particular radio devices' error rate may later improve to the point that the particular radio device's error rate falls below a specified lower threshold. In response to determining that the particular radio device's error rate has subsequently fallen below the specified lower threshold, load-balancing radio device 102 re-activates the link to the particular radio device, so that load-balancing device 102 resumes sending data packets to the particular radio device over the link. The upper and lower thresholds may be user-programmable.

In one embodiment of the invention, the upper threshold is set to 10%, such that if a particular radio's error rate over some specified period of time reaches at least 10%, then the link to that particular radio is at least temporarily deactivated. In one embodiment of the invention, the lower threshold is set to 1%, such that if a particular radio's error rate over some specified period of time falls down to 1% while the link to that particular radio is deactivated, then the link to the particular radio is re-activated.

In one embodiment of the invention, a particular radio's error rate is determined based on the status messages discussed above. Load-balancing radio device 102 periodically sends, to each of radio devices 104A-N, separate status messages that radio devices 104A-N then transmit onward to their counterparts among radio devices 106A-N. Load-balancing radio device 102 even sends these status messages to those of radio devices 104A-N whose links are currently deactivated (although load-balancing radio device 102 does not send any data packets, which contain data that devices within or beyond network 112 might read or use, over any deactivated links). Radio devices 106A-N receive at least some of the status messages over the air from radio devices 104A-N. Each of radio devices 106A-N sends its received status messages through a separate port of aggregating radio device 108. Aggregating radio device 108 counts the number of status messages that are received over each port during a specified time interval.

During the same time interval, aggregating radio device 108 reports each of these counts for that time interval back to load-balancing radio device 102. In one embodiment of the invention, aggregating radio device 108 reports these counts by including the counts within status messages that aggregating radio device 108 sends through radio devices 106A-N back toward radio devices 104A-N and load-balancing radio device 102 (the sending of status messages and use of those status messages to determine link quality is, in one embodiment, bi-directional and used to determine link qualities for both sets of radios 104A-N and radios 106A-N). Radio devices 104A-N receive the count-containing status messages transmitted from radio devices 106A-N. Radio devices 104A-N forward the count-containing status messages to load-balancing radio device 102 through the ports to which radio devices 104A-N are connected.

Thus, load-balancing radio device 102 obtains, for each particular radio device of radio devices 104A-N, a count of the number of status messages that were both (a) sent by the particular radio device and (b) ultimately received by aggregating radio device 108. By dividing (a) the count for the particular radio device (for the current time interval), as indicated in the received status message, by (b) the total number of status messages transmitted by the particular radio device during the current time interval (some of which might not have been received at aggregating radio device 108), and subtracting the quotient from 1, load-balancing radio device 102 determines the error rate, for the current time interval, of the particular radio device. As is discussed above, based on the particular radio device's error rate, load-balancing radio device 102 may deactivate or re-activate the link to the particular radio device.

In one embodiment of the invention, load-balancing radio device 102 sends the status messages to each of radio devices 104A-N at fixed periods of time. For example, each time period might be 1 millisecond, such that the status messages are sent every millisecond. In one embodiment of the invention, the "current time interval" comprises the last "N" number of these time periods, where "N" is some specified value. For example, "N" might be 256, such that the current time interval is the most recent 256 milliseconds. Thus, the current time interval is a "sliding window" of time; counts that were gathered during time periods less recently than the least recent "edge" of the current time interval (e.g., more than 256 milliseconds ago) are forgotten and ignored for purposes of calculating the current time interval's error rates. The error rate for each of radio devices 104A-N may change during each successive time interval, which "slides" during each time period (e.g., every millisecond). Thus, the measurement of the error rate of each of radio devices 104A-N, and the decision, based on that error rate, of whether to deactivate or re-activate that radio devices' link, is made in each time interval, according to an embodiment of the invention.

In an alternative embodiment of the invention, load-balancing radio device 102 only deactivates a link to a particular radio device in response to a determination that the error rate of the particular radio device met or exceeded the specified upper threshold during each of several consecutive time intervals (e.g., the last 10 consecutive time intervals of 256 milliseconds each).

In an embodiment of the invention described above, load-balancing radio device 102 automatically deactivates the link to a particular radio device of radio devices 104A-N in response to determining that the particular radio device has an error rate that is at least as great as the specified upper threshold. However, it is possible that the particular radio device's high error rate is not due to any fault of the particular radio device or its link. Under some circumstances, the particular radio device's high error rate might be due to other factors such as systemic congestion. Under such circumstances, deactivating the particular radio's link would not be productive.

Therefore, in an alternative embodiment of the invention, before load-balancing radio device 102 deactivates any link, load-balancing radio device 102 first determines whether the error rates of all of radio devices 104A-N are at least as great as the specified upper threshold. If the error rates of all of radio devices 104A-N are at least as great as the specified upper threshold, then this is an indication that the error rate is systemic rather than isolated to just the particular radio device, and so under those circumstances, load-balancing radio device 102 does not deactivate any radio device's link. Alternatively, if load-balancing radio device 102 determines that the error rates of one or more of the other ones of radio devices 104A-N are still below the upper threshold, then load-balancing radio device 102 at least temporarily deactivates the particular radio device's link as discussed above.

Radio Device-Performed Mac Address Filtering

Figure 3:
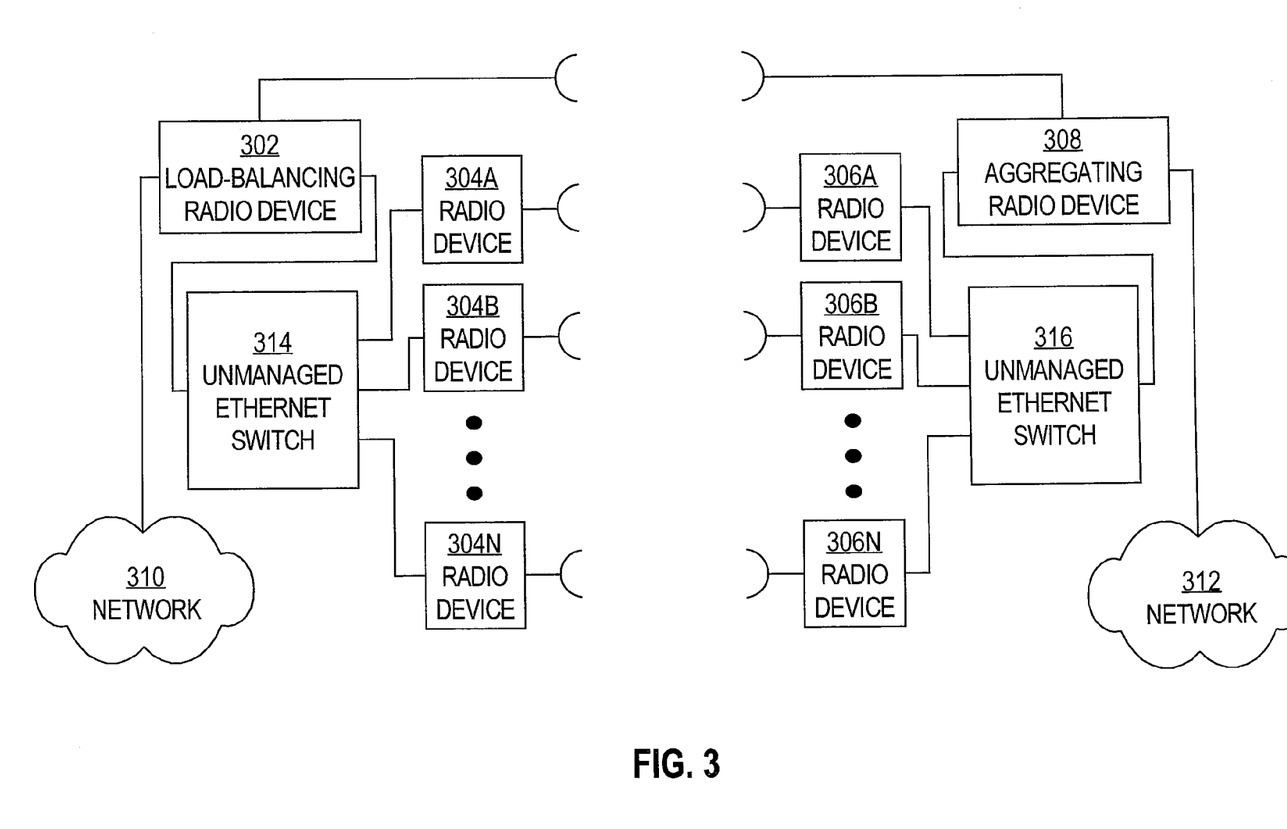
FIG. 3 is a diagram that illustrates an example of a multi-radio communication system in which a load-balancing radio device, an aggregating radio device, and a set of other radio devices interact through Ethernet switches, according to an embodiment of the invention.

FIG. 3 is a diagram that illustrates an example of a multi-radio communication system in which a load-balancing radio device, an aggregating radio device, and a set of other radio devices interact through Ethernet switches, according to an embodiment of the invention. Although FIG. 3 illustrates an embodiment of the invention in which Ethernet switches are used, in some alternative embodiments of the invention, Ethernet switches are not used at all. In FIG. 3, components 302-312 correspond to components 102-112 of FIG. 1, and have nearly identical functionality, with some exceptions that are discussed herein. The system of FIG. 3 additionally shows unmanaged Ethernet switch 314 and unmanaged Ethernet switch 316. These switches are unmanaged in the sense that no user or administrator needs to program these switches with routing or filtering information in order for those switches to function. Although the switches might automatically "learn" which of the switches' ports correspond to different MAC addresses over time, the switches do not specifically need to be programmed or otherwise configured with that information. No mapping between the ports of the switches and specific MAC addresses needs be generated by any user of the system shown in FIG. 3. Switches 316 and 314 can be generic Ethernet switches from any vendor, without any special system-specific capabilities other than number of ports and standard data rate it can support (100M, 1G, 10G bps, etc.)—in other words, switches 314 and 316 are of the generic kind that could be used as Ethernet switches in any system in a switching capacity, and not only in the system shown in FIG. 3. Due to fact that many users of the system shown in FIG. 3 might lack the sophistication or desire to configure switches 314 and 316 with mappings between ports and MAC addresses, it may be desirable not to require users of the system to be able to configure switches 314 and 316. Unmanaged switches are also typically less expensive than managed switches are.

As shown in FIG. 3, load-balancing radio device 302 receives Ethernet data packets from network 310. Load-balancing radio device 302 makes a load-balancing decision (using techniques similar to those described above) as to whether those packets should be transmitted over the radio waves by load-balancing radio device 302 itself, or whether those packets should be transmitted over the radio waves by particular ones of radio devices 304A-N. Device 302 may or may not have a radio link. In one embodiment of the invention, device 302 is a standalone load-balancer/aggregator. According to an embodiment of the invention, each of radio devices 304A-N comes pre-configured with a separate MAC address from a set of reserved MAC addresses (reserved in the sense that each such MAC address is assured to be assigned to no more than one device in the system of FIG. 3, although such MAC addresses may potentially be assigned to other devices that are not within the system of FIG. 3). Thus, each of radio devices 304A-N has a separate MAC address that the user of the system of FIG. 3 does not need to configure.

Upon determining that a data packet ought to be transmitted by one of radio devices 304A-N (based on load-balancing considerations), load-balancing device 302 encapsulates that data packet within another "encapsulating" Ethernet data packet. The encapsulating data packet specifies, as a source MAC address, the MAC address that is assigned to the one of radio devices 304A-N that has been selected to transmit the encapsulated data packet. The encapsulating data packet additionally specifies, as a destination MAC address, a MAC address that is assigned to the one of radio devices 306A-N that is the "receiving" side of the radio pair in which the "transmitting" side is the one of radio devices 304A-N that has been selected to transmit the data packet. Like radio devices 304A-N, each of radio devices 306A-N comes pre-configured with a separate MAC address from the same reserved set of MAC addresses discussed above. Thus, each of radio devices 306A-N also has a separate MAC address that the user of the system of FIG. 3 does not need to configure. After encapsulating the original data packet in this manner, load-balancing device 302 sends the encapsulating data packet to switch 314.

Before switch 314 has automatically learned any associations between its outgoing ports and the MAC addresses specified in the encapsulating packets that it receives, switch 314 will not know through which of its outgoing ports any encapsulating packets ought to be sent. Therefore, under such circumstances (which are likely to exist when the system of FIG. 3 has just recently been initialized), switch 314 will receive an encapsulating data packet from load-balancing radio device 302 and will send that encapsulating data packet through each of the outgoing ports of switch 314, thereby sending the encapsulating data packet to each one of radio devices 304A-N.

Clearly, although there are circumstances under which each of radio devices 304A-N might receive the same encapsulating data packet, only one (specifically, the selected one) of radio devices 304A-N actually ought to transmit that encapsulating packet over the radio waves. Therefore, according to an embodiment of the invention, whenever any one of radio devices 304A-N receives a data packet, that radio device determines whether the data packet's source MAC address (which will be the MAC address indicated in the outermost Ethernet header, or the MAC address indicated in the Ethernet header of the encapsulating packet) matches the MAC address with which that radio device was pre-configured. If the radio device's assigned MAC address does not match the packet's source MAC address, then the radio device drops the packet instead of transmitting the packet over the radio waves, thereby filtering out the packet.

Presumably, the source MAC address indicated in the encapsulating packet matches a MAC address assigned to exactly one of radio devices 304A-N. That radio device does not filter out the encapsulating packet, but, instead, transmits the encapsulating packet over the radio waves to the corresponding one of radio devices 306A-N on the receiving side of the radio communication. The corresponding one of radio devices 306A-N receives the encapsulating packet over the radio waves and forwards that packet to unmanaged Ethernet switch 316. Switch 316, in turn, sends the encapsulating packet at least to aggregating radio device 308. Aggregating radio device 308 aggregates, re-orders, and decapsulates data packets using techniques that are described above before sending decapsulated data packets onward to their intended destinations through network 312.

In one embodiment of the invention, a user of radio devices 304A-N and radio devices 306A-N accesses a user interface of each such device in order to choose, for that device, a unique number in the system. For example, radio device 304A might be assigned the number "1," while radio device 306A might be assigned the number "7." A pre-configured table in each radio device maps such a number to a separate one of the reserved MAC addresses, such that no MAC address is assigned to more than one number. Thus, users do not even need to be aware of what the MAC addresses themselves are. In one embodiment of the invention, a user is instructed that radios that belong to transmitting-receiving pairs ought to be assigned certain pairs of numbers by the user.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A radio device system comprising:
a load-balancing device configured to distribute data traffic to a plurality of radio devices;
a radio device, of the plurality of radio devices, that comprises a queue that receives data packets, of the data traffic, that are sent to the radio device from the load-balancing device;
wherein the load-balancing device is configured to:
determine whether the radio device is no longer functioning correctly;
in response to determining that the radio device is no longer functioning correctly, redistribute the data packets, of the data traffic, that would otherwise have been received by the radio device if the radio device had been functioning correctly, to another radio device of the plurality of radio devices;
wherein the radio device is configured to:
determine whether a current queue depth of the queue of the radio device is at least as great as an upper threshold;
in response to determining that the current queue depth of the queue of the radio device is at least as great as an upper threshold, send, to the load balancing device, a stop message that instructs the load balancing device to at least temporarily stop sending packets to the radio device and continue sending data, of the data traffic, to another radio device of the plurality of radio devices.

2. The radio device system of claim 1,
wherein each radio device of the plurality of radio devices comprises a separate queue that receives data packets that are sent to said each radio device from the load-balancing device;
wherein each radio device is configured to:
determine whether a queue depth of the separate queue of said each radio device is at least as great as the upper threshold;
send, to the load-balancing device, if it is determined that the queue depth is at least as great as the upper threshold, a message that instructs the load-balancing device to at least temporarily stop sending packets to said each radio device.

3. The radio device system of claim 2, wherein the radio device is further configured to:
determine whether the current queue depth is at least as small as a lower threshold;
send, to the load-balancing device, if it is determined that the current queue depth is at least as small as the lower threshold, a resume message that instructs the load-balancing device to resume sending packets to the radio device.

4. The radio device system of claim 1, wherein:
the load-balancing device comprises a plurality of ports through which the load-balancing device (a) sends data packets to the plurality of radio devices connected with the plurality of ports and (b) receives flow control messages from the plurality of radio devices; and
the load-balancing device is configured to:
receive a stop flow control message through a particular port of the plurality of ports;
in response to receiving the stop flow control message, stop sending data packets through the particular port;
resume sending data packets through the particular port in response to one or more criteria being satisfied.

5. The radio device system of claim 4, wherein the one or more criteria is whether the load balancing device receives, through the particular port, a resume flow control message.

6. The radio device system of claim 4, wherein:
the load-balancing device is configured to:
maintain a separate timeout clock for each port of the plurality of ports;
start a particular timeout clock that is associated with the particular port in response to receiving the stop flow control message through the particular port;
the one or more criteria is whether the particular timeout clock expires.

7. The radio device system of claim 4, wherein the load balancing device is further configured to:
determine whether the load-balancing device has already stopped sending data packets over all ports of the plurality of ports other than the particular port in response to receiving another "stop" flow control message through the particular port; and
resume sending data packets over all ports of the plurality of ports in response to the load-balancing device determining that the load-balancing device has already stopped sending data packets over all ports of the plurality of ports other than the particular port.

8. The radio device system of claim 1, further comprising:
an aggregating radio device;
wherein the load-balancing device is configured to periodically send a status message to the aggregating radio device through one or more radio devices of the plurality of radio devices;
wherein the aggregating radio device is configured to:
monitor status messages from the load-balancing device and compute a radio link status;
periodically send, through at least one port of a plurality of ports of the aggregating radio device, a status message that informs the load-balancing device that a particular pair of communicating radio devices, which transmit and receive the status message, is functional; and
wherein the particular pair is associated with said at least one port.

9. The radio device system of claim 8, wherein the load-balancing device is configured to:
determine, based at least in part on a count of status messages that a particular radio device transmitted over the air and that were also received by the aggregating radio device, an error rate of the particular radio device;

temporarily stop sending data packets to the particular radio device in response to a determination that the error rate exceeds a specified threshold.

10. The radio device system of claim 9, wherein the load-balancing device is configured to:
determine an error rate of a particular radio device of the plurality of radio devices;
determine whether error rates of all radio devices of the plurality of radio devices exceed the specified threshold in response to a determination that the error rate exceeds a specified threshold;
continue sending data packets through the particular radio device even though the error rate of the particular radio device exceeds the specified threshold in response to determining that the error rates of all radio devices of the plurality of radio devices exceed the specified threshold.

11. A method comprising:
transmitting, by a load-balancing device, to a radio device of a plurality of radio devices, data packets of data traffic to cause storing the data packets in a queue of the radio device;
determining whether the radio device is no longer functioning correctly;
in response determining that the radio device is no longer functioning correctly, redistributing the data packets, of the data traffic, that would otherwise have been received by the radio device if the radio device had been functioning correctly, to another radio device of the plurality of radio devices;
causing the radio device to:
determine whether a current queue depth of the queue of the radio device is at least as great as an upper threshold;
in response to determining that the current queue depth of the queue of the radio device is at least as great as an upper threshold, send, to the load balancing device, a stop message that instructs the load balancing device to at least temporarily stop sending packets to the radio device and continue sending data, of the data traffic, to another radio device of the plurality of radio devices;
wherein the method is performed by one or more computing devices.

12. The method of claim 11, further comprising:
causing the radio device to:
after sending the stop message, determining a second current queue depth of the queue;
determining whether the second current queue depth is at least as small as a lower threshold that is less than the upper threshold;
in response to determining that the second current queue depth is at least as small as the lower threshold, sending, by the radio device, to the load-balancing device, a resume message that instructs the load-balancing device to resume sending packets to the radio device.

13. The method of claim 12, further comprising:
causing the radio device to:
determine whether the current queue depth is at least as small as a lower threshold;
send, to the load-balancing device, if it is determined that the current queue depth is at least as small as the lower threshold, a resume message that instructs the load-balancing device to resume sending packets to the radio device.

14. The method of claim 11, wherein the load-balancing device comprises a plurality of ports through which the load-balancing device (a) sends data packets to the plurality of radio devices connected with the plurality of ports and (b) receives flow control messages from the plurality of radio devices; and
wherein the method further comprises:
receiving a stop flow control message through a particular port of the plurality of ports;
in response to receiving the stop flow control message, stopping sending data packets through the particular port;
resuming sending data packets through the particular port in response to one or more criteria being satisfied.

15. The method of claim 14, wherein the one or more criteria is whether the load balancing device receives, through the particular port, a resume flow control message.

16. The method of claim 14, further comprising:
maintaining a separate timeout clock for each port of the plurality of ports;
starting a particular timeout clock that is associated with the particular port in response to receiving the stop flow control message through the particular port;
wherein the one or more criteria is whether the particular timeout clock expires.

17. The method of claim 14, further comprising:
determining whether the load-balancing device has already stopped sending data packets over all ports of the plurality of ports other than the particular port in response to receiving another stop flow control message through the particular port; and
resuming sending data packets over all ports of the plurality of ports in response to the load-balancing device determining that the load-balancing device has already stopped sending data packets over all ports of the plurality of ports other than the particular port.

18. The method of claim 11, further comprising:
periodically sending a status message to an aggregating radio device through one or more radio devices of the plurality of radio devices;
monitoring status messages from the load-balancing device and compute a radio link status;
periodically sending, through at least one port of a plurality of ports of the aggregating radio device, a status message that informs the load-balancing device that a particular pair of communicating radio devices, which transmit and receive the status message, is functional; and
wherein the particular pair is associated with said at least one port.

19. The method of claim 18, further comprising:
determining, based at least in part on a count of status messages that a particular radio device transmitted over the air and that were also received by the aggregating radio device, an error rate of the particular radio device;
temporarily stopping sending data packets to the particular radio device in response to a determination that the error rate exceeds a specified threshold.

20. The method of claim 19, further comprising:
determining an error rate of a particular radio device of the plurality of radio devices;
determining whether error rates of all radio devices of the plurality of radio devices exceed the specified threshold in response to a determination that the error rate exceeds a specified threshold;
continuing sending data packets through the particular radio device even though the error rate of the particular radio device exceeds the specified threshold in response to determining that the error rates of all radio devices of the plurality of radio devices exceed the specified threshold.

* * * * *